July 8, 1958 — H. R. REULAND — 2,842,043
FOOD SMOKING APPLIANCE
Filed Oct. 4, 1954
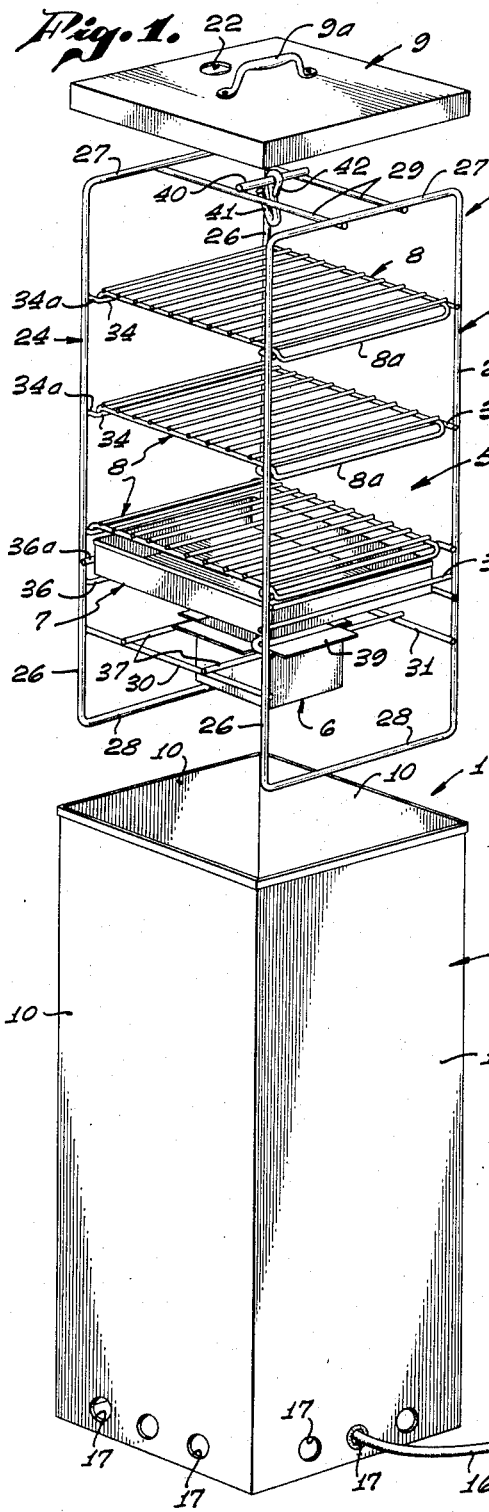
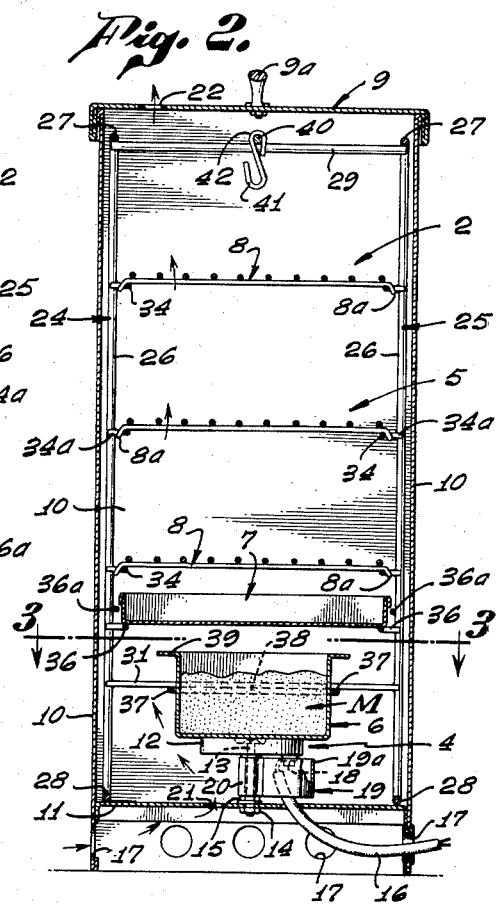
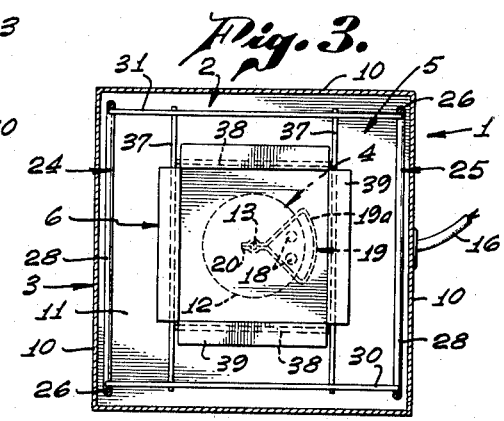
INVENTOR.
HOWARD R. REULAND,
BY
Paul A. Weilein
ATTORNEY.

United States Patent Office 2,842,043
Patented July 8, 1958

2,842,043

FOOD SMOKING APPLIANCE

Howard R. Reuland, Arcadia, Calif.

Application October 4, 1954, Serial No. 460,112

11 Claims. (Cl. 99—259)

This invention relates to food smoking apparatus.

It is an object of this invention to provide apparatus of this character in the form of a novel household appliance of simple construction and capable of being efficiently operated by persons inexperienced in the art of smoking food.

Another object of this invention is to provide a food smoking appliance such as described which is an improvement over known smoking appliances in point of simplicity of construction, compactness, inexpensiveness, large capacity in consideration of its size, low weight and ease of operation.

A further object of this invention is to provide a portable food smoking device such as described which embodies a novel unit construction, wherein one unit includes a housing and a heating element combined in a novel manner whereby another unit, comprising a novel unification of a food-supporting rack and a container for smoke producing material, readily and easily may be mounted in and removed from the housing unit in the operation of smoking food.

This invention possesses many other advantages and has other objects which may be made more easily apparent from a consideration of one embodiment of the invention. For this purpose there is shown one form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawings:

Fig. 1 is an exploded view of a food smoking appliance, embodying the present invention;

Fig. 2 is a vertical sectional view of the appliance as assembled for operation; and Fig. 3 is a cross sectional view taken on the line 3—3 of Fig. 2.

As shown in the accompanying drawing, a food smoking appliance, embodying this invention essentially includes a pair of units generally designated 1 and 2. The unit 1 comprises a housing 3 and heating means 4.

The unit 2 comprises a food-supporting rack 5 and a container 6 for smoke producing material. Unit 2 readily may be inserted into and removed from the housing 3 of unit 1.

When unit 2 is positioned in the housing 3, the container 6 will rest upon the heating means 4, whereby upon actuation of the heating means the smoke producing material in the container 6 produces smoke for a food smoking operation. A drip pan 7 is supported on the rack 5 below the grid-like wire trays or shelves 8 likewise supported on the rack 5.

A cover or lid 9 having a handle 9a is provided for closing the upper end of the housing 3.

The housing 3, as here shown, is elongated and of non-circular cross section, being adapted to be stood on one end and having an open upper end. It comprises four sheet metal side walls 10 and a sheet metal bottom wall 11 located somewhat above the lower ends of the side walls.

The heating means 4 may be of any suitable form. As here shown, it comprises a flat, disk type, electric heating element 12 mounted so as to extend above the bottom wall 11 by means of a bolt 13 and nuts 14.

An electrical conductor cord 16 extends through one of the air intake openings 17 in the lower ends of the side wall 10 and through the bottom wall 11 for connection as at 18 with the heating element. A guard member 19 in the form of a loop extends around and protects the points of connection of the conductor cord 16 with the heating element 12. The ends of the member 19 are brought together around the bolt 13 and secured one to the other by spot welding as at 20. The lower edge of the member 19 is spaced from the bottom wall by means of the spacer element 15 to prevent the conduction of heat to the bottom wall. The loop formed by the member 19 extends laterally beyond the outer periphery of the heating element 12 as at 19a to provide for free circulation through the loop, thereby preventnig the creation of a heat zone therein.

Air to support combustion of the smoke producing material M in the container 6 is admitted through the openings 17 in the side walls 10, and passes into the housing through a single opening 21 in the bottom wall 11. A single vent opening 22 is provided in the cover or lid 9, it having been found that the desired combustion will take place with this arrangement of the openings in the bottom wall and cover respectively.

The food supporting rack 5 of the unit 2 preferably is made of suitable wire which is bent and welded to produce a rectangular skeleton frame. This frame includes two side members 24 and 25. Each side member comprises a pair of upright rods 26 joined at their upper and lower ends by cross rods 27 and 28. The two side members 24 and 25 are joined one to the other at their upper ends by means of a pair of tie rods 29 welded to the upper cross rods 27 at points intermediate the ends of the latter. Other tie rods 30 and 31 connect the side members 24 and 25 adjacent the lower end of the frame.

A plurality of the food supporting shelves 8 are removably mounted one above the other on supporting rods 34 which extend between and are welded to the rods 26 of the side members 24 and 25 respectively. The supporting rods 34 have outwardly bent ends 34a which are welded to the upright rods 26. The portions of the rods 34 between the ends 34a are inwardly offset from the upright rods 26. This permits of sliding the shelves 8 between the side members 24 and 25 onto and from the rods 34 from either of two sides of the rack. Two of the opposite margins of the shelves 8 are bent downwardly to form hook-like portions 8a adapted to hook over the supporting rods 34 to hold the shelves in place. These hook-like portions restrain the shelves against movement transversely of the rods 34. The ends of the hook-like portions will abut the outwardly bent ends 34a of the rods 34 to restrain movement of the shelves longitudinally of the rods 34 while the shelves are supported on the rods. However, upon lifting the shelves to clear the ends of the hook-like portions 8a from the ends 34a of the rods 34, the shelves may be moved out of the rack from either side of the rack between the side members 24 and 25.

The drip pan 7 is removably supported between the lowermost shelf 8 and the container 6, on rods 36 which are identical with the rods 34, and secured to the upright rods 26 in the same manner as the rods 34. This pan, like the shelves 8, is dimensioned to slide into and out of place longitudinally of the supporting rods therefor. Rods 36a, welded to and extending between the upright rods 26, restrain lateral movement of the pan relative to the rods 36.

Means are provided on the rack 5 whereby the container 6 for the smoke producing material, which latter may be sawdust or any other form of wood usually employed in food smoking operations, may be supported as a part of the rack in a manner assuring that proper heat transfer from the heating element will be effected upon mounting the rack in the housing 3. As here shown, this means provides for resting the container upon the heating element. Accordingly, the container 6 is vertically, movably supported on the rack so that by its weight the flat bottom surface thereof will be disposed in intimate contact with the flat surface of the heating element. This adjustable support of the container 6 may be effected by suspending the container from pairs of rods 37 and 38. The rods 37 are welded to the lower tie rods 30 and 31, whereas the rods 38 extend between and are welded to the rods 37, thereby forming a guiding and supporting frame for the container. Flanges 39 on the upper open end of the container 6 extend laterally therefrom so that they may be positioned upon the rods 37 and 38 to support the container in place on the rack. The container 6 readily may be mounted in place and removed therefrom when the drip pan 7 and lowermost shelf 8 are removed from the rack. Fig. 2 shows how the container 6 is urged somewhat upwardly by its contact with the heating element 12, whereby it will rest in intimate contact with the heating element during the smoking operation.

A short rod 40 disposed transversely between and welded to the upper tie rods 29 serves as a convenient handle in placing, removing and carrying the rack unit 2. A hook 41, pivoted by its eye 42 on the rod 40, provides for suspending the rack unit from a suitable support.

It will now be apparent that with the rack unit 2 removed from the housing unit 1, food to be smoked readily may be placed on the shelves 8 when the latter are removed from the unit or after the shelves are in place thereon. Assuming now that the container 6 is in place and has been substantially filled with the smoke-producing material M, the rack unit 2 with the food in place on the shelves may be lowered into the housing 3. In this connection it should be noted that the housing and rack units are dimensioned so that the rack unit may be lowered in place in any position in which its sides are parallel with the sides of the housing.

Before the lower end of the rack unit 2 comes to rest on the bottom wall 11 of the housing 3, the bottom of the container 6 will contact the upper surface of the disk heating element and assume a position, for example as shown in Fig. 2, when the rack unit rests on the bottom wall 11. This assures that the proper contact is made with the heating element to provide for the desired smoke producing combustion of the material in the container 6.

After the usual smoking operation has been carried out the unit 2 readily may be removed from the housing unit 1.

It will now be seen that the novel, compact, simple and inexpensive construction of the smoking appliance of this invention makes it unnecessary to separately position the food supporting means and the smoke producing means in the housing, and provides for readily and easily carrying out a food smoking operation in a particularly efficacious manner.

It will also be apparent that in providing for removal of the food supporting rack, shelves, drip pan and container for the smoke producing material as a unit, from the housing, all of the elements of the rack unit as well as the housing readily may be cleaned. The compact, disk-type heater in being spaced above the bottom wall of the housing facilitates cleaning of the housing.

I claim:

1. A food smoking appliance including: a housing; a food supporting rack adapted to be mounted in said housing and removed therefrom; a container for smoke producing material; means mounting said container on said rack for movement therewith into and out of said housing; said mounting means providing for movement of said container relative to said rack and heating means operable in said housing to effect combustion of said material, said heating means having a surface disposed for contacting and supporting said rack with the container thereon when said container is mounted in said housing.

2. A food smoking appliance including: a housing; a food supporting rack adapted to be mounted in said housing and removed therefrom; a container for smoke producing material; means supporting said container on said rack providing for movement of said container relative to said rack; and a heating element fixed in said housing in a position to contact and support said container when said container is mounted in said housing.

3. A food smoking appliance including: a housing; a food supporting rack adapted to be mounted in said housing and removed therefrom; a container for smoke producing material; means supporting said container on said rack providing for movement of said container relative to said rack; and a heating element fixed in said housing; said container and said heating element having flat surfaces which abut one another when said rack is mounted in said housing.

4. A food smoking appliance comprising: a housing having a bottom wall; said housing having an open upper end; a heating element fixed to said bottom wall; a food supporting rack insertible into said housing through said open end; and a container for smoke producing material carried by said rack in position to contact said heating element when the rack is supported in said housing.

5. A food smoking appliance comprising: a housing having a bottom wall; said housing having an open upper end; a heating element fixed to said bottom wall; a food supporting rack insertible into said housing through said open end; and a container for smoke producing material carried by said rack in position to rest upon said heating element when said rack is positioned in said housing to rest upon said bottom wall.

6. A food smoking appliance comprising: a housing having a bottom wall; said housing having an open upper end; a heating element fixed to said bottom wall; a food supporting rack insertible into said housing through said open end; a container for smoke producing material; and means on said rack supporting said container for vertical movement relative to the rack in a position such that the container will rest upon said heating element when said rack is supported in a predetermined position in said housing.

7. A food smoking device, including: an elongated housing adapted to stand on end and having its upper end open; a bottom wall in said housing; a heating element fixed to said bottom wall; said element having a heating surface spaced upwardly from said bottom wall; a food supporting rack adapted to be mounted in said housing so as to stand on said bottom wall subject to removal from said housing; a food supporting shelf on said rack; and a container for smoke producing material mounted on said rack below said shelf in a position for causing the bottom thereof to rest upon said heating surface when said rack stands on said bottom wall.

8. A food smoking device, including: an elongated housing adapted to stand on end and having its upper end open; a bottom wall in said housing; a heating element fixed to said bottom wall; said element having a heating surface spaced upwardly from said bottom wall; a food supporting rack adapted to be mounted in said housing so as to stand on said bottom wall subject to removal from said housing; a food supporting shelf on said rack; a drip pan on said rack below said shelf; a container for smoke producing material; and means on said rack supporting said container thereon beneath said pan in a position to stand on said heating surface.

9. A food smoking device, including: an elongated housing adapted to stand on end and having its upper end open; a bottom wall in said housing; a heating element fixed to said bottom wall; said element having a heating surface spaced upwardly from said bottom wall; a food supporting rack adapted to be mounted in said housing so as to stand on said bottom wall subject to removal from said housing; a food supporting shelf on said rack; and a container for smoke producing material; supporting members on said rack; said container being vertically movable between said supporting members and maintained thereby in position to rest upon said heating surface when said rack is positioned in said housing; and means on said container engageable with said supporting members to maintain said container between said members.

10. A food smoking device, including: an elongated housing adapted to stand on end and having its upper end open; a bottom wall in said housing; a heating element fixed to said bottom wall; said element having a heating surface spaced upwardly from said bottom wall; a food supporting rack adapted to be mounted in said housing so as to stand on said bottom wall subject to removal from said housing; said rack comprising an elongated skeleton wire frame; a plurality of food supporting shelves mounted one above the other on said frame; a drip pan on said frame below said shelves; a container for smoke producing material; supporting members on said frame between which said container is vertically movable and by which said container is maintained in line with said heating surface for contact therewith when the rack stands on said bottom wall; and laterally projecting flanges on said container overlying said supporting members.

11. A food smoking appliance comprising: a housing having side and bottom walls and an open upper end; heating means on said bottom wall; a food supporting rack insertible into said housing and removable therefrom through said open end; said rack standing on said bottom wall when positioned in said housing; a container for smoke producing material; and means on said rack and said container respectively cooperable to vertically adjustably support said container above the lower end of said rack in position to rest upon said heating means when the rack stands on said bottom wall; said last named means including supporting members carried by said rack above said lower end and extending along the sides of said container; and projections on said container extending over said supporting members for supporting said container on said supporting members when inserting and removing the rack.

References Cited in the file of this patent

UNITED STATES PATENTS

| | | |
|---|---|---|
| 2,221,098 | Langsam | Nov. 12, 1940 |
| 2,338,156 | Allen | Jan. 4, 1944 |

FOREIGN PATENTS

| | | |
|---|---|---|
| 288,405 | Switzerland | Jan. 31, 1953 |

UNITED STATES PATENT OFFICE
CERTIFICATE OF CORRECTION

July 8, 1958

Patent No. 2,842,043

Howard R. Reuland

It is hereby certified that error appears in the printed specification of the above numbered patent requiring correction and that the said Letters Patent should read as corrected below.

Column 4, lines 11 and 12, claim 1, for "contacting and supporting said rack with the container thereon when said container is mounted in said housing." read -- contacting and supporting said container when said rack with the container thereon is mounted in said housing. --.

Signed and sealed this 24th day of February 1959.

(SEAL)
Attest:

KARL H. AXLINE
Attesting Officer

ROBERT C. WATSON
Commissioner of Patents